March 30, 1948.     I. WOLFF     2,438,836
PULSE ECHO DISTANCE MEASURING SYSTEM
Filed July 31, 1941
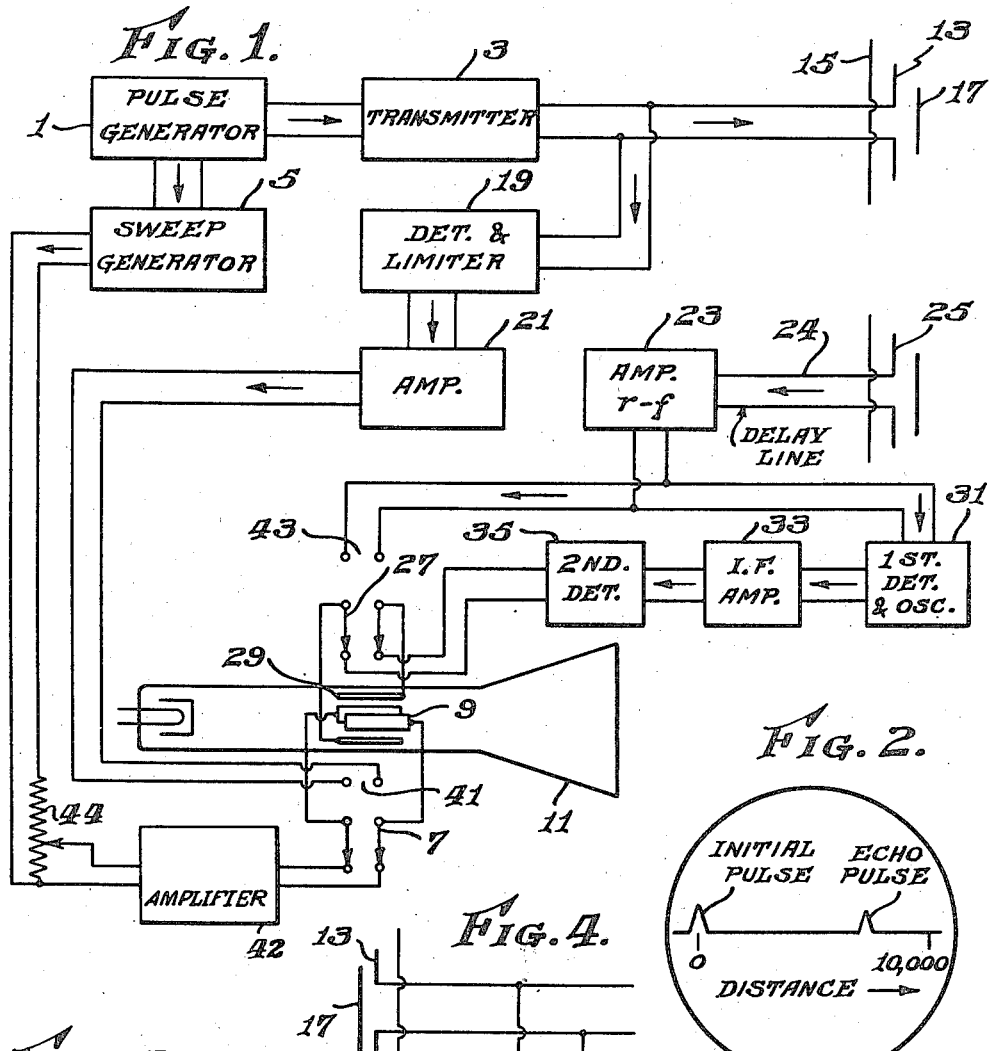
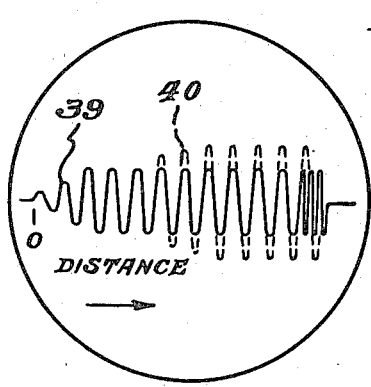
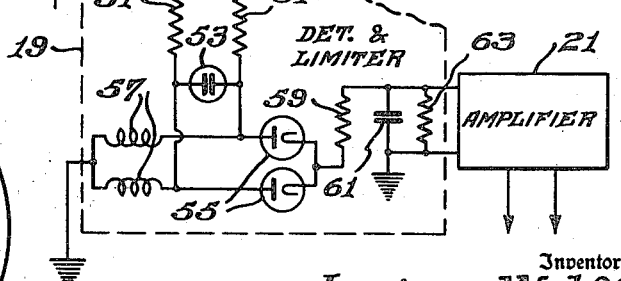
Inventor
Irving Wolff
Attorney Patented Mar. 30, 1948

2,438,836

UNITED STATES PATENT OFFICE 2,438,836

PULSE ECHO DISTANCE MEASURING SYSTEM

Irving Wolff, Merchantville, N. J., assignor to Radio Corporation of America, a corporation of Delaware Application July 31, 1941, Serial No. 404,845

18 Claims. (Cl. 343—13)

This invention relates to an improved radio pulse echo distance measuring system and especially to a sensitive altimeter provided with scales for high altitudes and for low altitudes whereby low altitudes may be determined with accuracy.

The method of measuring distance or altitude by observing the time required for a pulse of radio frequency energy to travel from an aircraft to the earth and back to the craft is well known. While the pulse echo method is sufficiently accurate for altitudes of the order about 50 or more meters, certain difficulties are experienced in measuring accurately distances of less than 50 meters. One method of indicating the pulse propagation time is to start a cathode ray timing trace at the instant the initial pulse is radiated and to deflect the ray along another coordinate at the instant the echo pulse is received. The initial pulse and the echo pulse appear as serrations in the cathode ray trace. Since even the shortest pulses have some duration, it follows that the serrations have appreciable width. For altitudes between, say, 50 meters and 10,000 meters, the pulses may have a duration of the order of 0.1 to 1.0 microsecond. It is not only difficult to radiate substantial amounts of energy in a shorter pulse but it is equally difficult to generate shorter pulses. A pulse time of 0.1 microsecond is equivalent to the pulse traveling 30 meters which corresponds to twice the distance to be measured. Furthermore, the initial pulse will occupy 15 meters of the scale and it will be difficult to distinguish the initial pulse and the echo pulse which will overlap for distances up to 30 meters. Furthermore, in the described system, since the pulse envelope is used, it may be difficult to select any precise point on the envelope as a reference mark. It might be thought that increasing the scale length would be a solution. However, increasing the scale length is accompanied by a corresponding increase in the width of the pulse trace so that the ratio is not improved.

Thus it appears that in any pulse echo distance measuring method the pulse envelope length is the factor determining the shortest measurable distance. It is therefore an object of this invention to provide means for measuring accurately short distances and the rate of change of distance by means of a pulse echo system in which the components of the pulse are used in place of the pulse envelope. Another object is to provide means in a pulse echo system for dividing the distance scale by applying timing potentials derived from the outgoing pulses. An additional object is to provide means in a pulse echo device for indicating altitudes above a predetermined limit as a function of pulse propagation times indicated by means including the pulse envelopes and below said predetermined altitude as a function of pulse propagation times indicated by means including the individual components of the pulses. A still further object is to provide an improved method for measuring distances as a function of pulse propagation times whereby pulses of the order of a microsecond duration may be used for both long and short distances and for indicating the rate of change of distance.

The invention will be described by referring to the accompanying drawing in which Fig. 1 is a block diagram illustrating an embodiment of the invention; Figs. 2 and 3 are graphs of the long and short distance indications, respectively; and Fig. 4 is a schematic circuit diagram of a detector and limiter which are used in one embodiment of the invention.

Referring to Fig. 1, a pulse generator or keyer 1 is connected to a transmitter 3 and a sweep generator 5. The sweep generator may be connected through a voltage divider 44, an amplifier 42, and by means of a double throw switch 7 to the horizontal deflecting elements 9 of a cathode ray tube 11. It should be understood that the voltage divider 40 and amplifier 42 may be omitted, and the sweep generator 5 connected directly to the switch 7. The output of the transmitter is applied to an antenna 13 which is preferably made directive by means of one or more reflectors 15. One or more directors 17 may be added, although in many practical installations they may be omitted. A portion of the transmitter output is directly or indirectly applied to a detector and limiter 19 which will be hereinafter described. The detector may be connected through an amplifier 21 and the switch 7 to the horizontal deflecting elements 9.

An R.-F. amplifier 23 may be connected by a transmission and delay line 24, to the transmitting antenna 13 or to a separate antenna 25 which receives a signal of low amplitude and of proper phase from the transmitter. The R.-F. amplifier may be connected through a double pole switch 27 to the vertical deflecting elements 29 of the cathode ray tube 11. The R.-F. amplifier is connected to a first detector and local oscillator and hence to an I.-F. amplifier 33. The output of the I.-F. amplifier 33 is applied to a second detector 35 which may be connected through the switch 27 to the vertical deflecting elements of the cathode ray tube 11. The cathode ray tube is energized and biased in the conventional manner by a suitable power source which is not shown. While a superheterodyne receiver circuit has been shown, other amplification and detection circuits may be used.

When the switches 7, 27 are in the position shown, and the voltage divider 44 and amplifier 42 are omitted, the operation is as follows: The cathode ray is swept horizontally in synchronism with each outgoing pulse. The outgoing pulses are received after reflection from the earth or other object whose distance is to be determined. The received echo pulses are amplified and detected. The detected pulses are applied to deflect the cathode ray vertically, as shown in Fig. 2. This method of operation is that of the conventional pulse echo system and is used for measuring distances in excess of about 50 meters. Since the pulse duration may be of the order of 1 microsecond, it follows that the pulse envelope or length will correspond to 150 meters on the distance scale.

The switches 7, 27 are connected to the upper terminals 41, 43, respectively, when measuring distances of less than about 50 meters. In this connection the sweep generator 5 is not used but in its place the outgoing pulses are rectified by a detector and limiter 19. The phase of the outgoing pulses may be determined by the point at which the detector is connected or coupled to the transmitter. The detector 19 includes a resistor-capacitor network having a time constant which is long compared to the pulse time but short compared to the sweep time of the generator 5. For example, if the pulse time is 1 microsecond, the time constant should be of the order of 3 or 4 microseconds. Preferably, the sweep rate should be uniform or approximately linear. The uniform sweep may be substantially obtained by limiting the amplitude of the detector output. The limited amplitude leads to a uniform charging rate for the capacitor and hence a uniform sweep.

At the same time the ray is swept horizontally by potentials from the rectifier, the directly received radio frequency currents of carrier frequency are applied to the vertical deflecting elements 29. The phase or timing of the directly received radio frequency currents is regulated by the time delay introduced by the delay line 24. The radio frequency components deflect the cathode ray in the vertical direction at the carrier frequency as shown by the trace 39. These variations of the trace, occurring at constant frequency, form an accurate timing scale which may be calibrated in distance units. For example, if the carrier frequency is 500 megacycles, the period between crossings of the base line will be .001 microsecond or 30 centimeters of pulse propagation which is equivalent to 15 centimeters of actual distance between the transmitter and the object. The amplitude of the traces due to the directly received radio frequency currents is preferably adjusted so that the trace is about ¼ inch high. It should be understood that only the first part of the sweep and timing potentials are used.

The reflected or echo pulse will be received and amplified at radio frequency. The amplified radio frequency currents are applied to the vertical deflecting elements so that the directly received radio frequency currents and the indirectly received radio frequency currents combine to produce a vertical deflection trace 41 which is greater or less than the timing trace as the direct and indirect pulses are in phase or out of phase, respectively. In the graph of Fig. 3 the timing pulse and the echo pulse radio frequency currents are represented as in phase. If the two radio frequency currents had been of opposite phase the trace 41 would have been of lesser amplitude. In either event the beginning of the combined trace 40 is referred to the beginning of the timing trace to indicate distance. The overlapping of the two traces does not interfere with reading the distance of the reflecting object, and the timing trace provides an accurate electrical calibration of time or distance.

When the device is used as an altimeter, another advantage is found in the short distance scale. For example, when landing, the aircraft pilot may not only observe the altitude of the craft, but the changing altitude will cause the phase of the echo pulses to vary so that the trace 41 will slowly increase and decrease in amplitude. The rate of such increase or decrease indicates the rate of descent or ascent. In like manner when the aircraft is taking off, the rate of climb will be indicated. In either ascending or descending it is only necessary for the observer to count the slowly varying changes in height of the combined trace to determine the rate of change of altitude. Thus a single means indicates simultaneously the altitude or distance and the rate of change of altitude or distance.

In the described system the fast sweep is derived from the outgoing pulse by rectifying and limiting. A simpler, but less well synchronized, method may be used. The rate of sweep depends upon the rate of change of deflecting potential. The slow sweep voltage may be amplified and, in the absence of overloading, the sweep rate will be increased by the same ratio as the voltage is amplified. Since higher voltage is not required, a fraction of the sweep voltage from the sweep generator 5 may be derived from the voltage divider 40, and may be amplified by the amplifier 42 to provide the fast sweep for the short distance scale.

The details of the rectifier and limiter 19 are shown in Fig. 4 in which the resistors 51 are inserted in the leads to the antenna transmission line to limit the power taken by the detector and limiter network. The remote terminals of the resistors are shunted by a gas discharge tube 53 which acts as a limiter. The anodes of a pair of diodes 55 are connected to the remote terminals of the resistors. The anodes are grounded through choke coils 57. The cathodes of the diodes are connected through a resistor 59 and a capacitor 61-resistor 63 network to ground. The time constant of the capacitor-resistor network is chosen as described above. In the detector and limiter network a selected portion of the transmitted pulse energy is limited, rectified and applied to the time constant circuit. The charging of the capacitor 61 provides the sweep potential. The discharge of the capacitor provides the return line potential for the sweep.

Other details of this pulse echo system are not included in this specification as the circuits and elements thereof are disclosed in the prior art, as, for example, in the Physical Review, vol. 28, page 554 (Sept. 1926).

Thus the invention has been disclosed as an improved pulse echo distance measuring system which is especially useful as a sensitive altimeter. For long distances the envelope of the pulse is used to deflect a cathode ray beam to indicate the reception of the echo pulse. The beam is also deflected over a distance scale by a sweep voltage which is synchronized with the outgoing pulses. For short distances, the distance sweep rate is increased and the radio frequency components of the outgoing pulses are applied to deflect the beam back and forth across the distance scale to apply timing indications. The echo pulse is amplified and its radio frequency components combine with the R.-F. timing swings thereby to indicate the distance of the pulse reflecting object. If the distance is changing the indications vary slowly so that the rate of change of distance may be determined.

I claim as my invention:

1. A pulse echo distance measuring system including, in combination, a pulse transmitter, a pulse generator connected to said transmitter for applying keying pulses thereto, a pulse receiver responsive directly to pulses from said transmitter and to pulses reflected from objects whose distances are to be measured, a cathode ray tube including a distance scale and elements for deflecting said ray along said scale and additional elements for deflecting said ray along another scale, means for deriving from said pulse transmitter sweep voltages synchronized with said keying, means for applying said sweep voltages to said distance scale deflecting elements, and means for applying high frequency voltages to said additional elements to deflect said ray along said other scale at a predetermined frequency.

2. A pulse echo distance measuring system including in combination a pulse transmitter, a pulse generator connected to said transmitter for applying keying pulses thereto, a pulse receiver responsive directly to pulses from said transmitter and to pulses reflected from objects whose distances are to be measured, a cathode ray tube including a distance scale and elements for deflecting said ray along said scale and additional elements for deflecting said ray along an amplitude scale, means for deriving from said pulse transmitter sweep voltages synchronized with said keying, means for applying said sweep voltages to said distance scale deflecting elements, and means including said pulse receiver for deriving high frequency components from said reflected pulses and for applying said high frequency components to said additional elements to deflect said ray along said amplitude scale and to indicate reception of said reflected pulses and the distance of the reflecting object.

3. A pulse echo distance measuring system including, in combination, means for radiating pulses of radio frequency energy, means for receiving said pulses after reflection from an object whose distance is to be measured, means for deriving from said pulses timing currents synchronized with said pulse radiation, an indicator including a timing means and signal responsive means, means for applying said timing currents to said timing means, and means including said receiving means for applying to said signal responsive means high frequency energy of the wave form received directly from said radiating means and said high frequency energy of the wave form received after reflection from an object whose distance is to be measured.

4. A system according to claim 3 including switching means connected to said timing means and to said signal responsive means, means for generating a timing voltage slower than said timing currents, means for deriving envelope currents from said pulse received after reflection, and means including said switching means for applying said timing voltages to said timing means and said envelope currents to said signal responsive means to indicate echo pulses received from objects at distances exceeding those corresponding to the maximum of said timing current.

5. A pulse echo distance measuring system including means for generating pulses of radio frequency energy, means for radiating said pulses toward an object whose distance is to be indicated as a function of time, means for receiving said pulses after reflection from said object, a cathode ray indicator including distance and amplitude scales, means for deflecting said cathode ray along said distance scale in synchronism with the radiation of said pulses, means for deflecting said ray along said amplitude scale by the radio frequency components of said pulses to apply time marking to said indicator, and means including said receiving means for deflecting additionally said ray along said amplitude scale as a function of the received reflected pulses.

6. A distance measuring system according to claim 5 including a sweep voltage generator synchronized with said pulse generating means, a detector effectively connected to said receiving means for deriving currents corresponding to the envelope of received reflected pulses, and switching means for connecting said sweep voltage generator for deflecting said ray on said distance scale and said detector for deflecting said ray on said amplitude scale of said cathode ray indicator for indicating echo pulses from objects at greater than a predetermined distance.

7. A radio frequency pulse echo system including, in combination, a sweep voltage generator, a keyer synchronized with said generator, a transmitter connected to said keyer, means connected to said transmitter for radiating pulses of radio frequency energy, a cathode ray tube including means for deflecting said ray along a distance scale as a function of said sweep voltage, and means for deflecting said ray along an amplitude scale, means for amplifying said sweep voltages whereby shorter distances may be indicated on said distance scale, a radio receiver including means for amplifying the radio frequency components of said pulses and for detecting said pulses, means for applying timing currents derived from the transmitted radio frequency currents to said amplitude scale of said cathode ray tube to mark said shorter distances, and means including said receiver for deflecting said ray on said amplitude scale in response to the radio frequency components of an echo pulse derived by reflection from objects within a predetermined distance and in response to the detected pulses derived by reflection from objects located beyond said predetermined distance.

8. A pulse echo distance system including means for generating a pulse of radio frequency energy, means for deriving from said pulse energy a sweep potential, a cathode ray tube including elements for deflecting said ray along two different coordinates, means for applying said sweep potential to said deflecting elements to deflect said ray along one coordinate, means for receiving said pulse energy directly and after reflection from an object whose distance is to be determined, and means for applying said directly received energy to deflect said ray along a second coordinate to form a timing trace and for applying said indirectly received energy to deflect said ray along said second coordinate to indicate the reception of an echo pulse.

9. The method of indicating on a cathode ray tube the distance of a radio pulse reflecting object which includes the steps of radiating pulses of radio frequency energy, deriving a synchronizing current from said radiated pulses, applying said current to said cathode ray tube to deflect said ray to indicate distance, deriving the radio frequency components of said radiated pulses to provide ray deflecting forces for said cathode ray tube, applying said forces to deflect said cathode ray for indicating time intervals corresponding to said radio frequency, receiving said pulses after reflection from said object, and applying said received pulses to said cathode ray tube for deflecting said ray to indicate the propagation time required for said pulses to travel to said object and from said object to the source of said pulse radiation.

10. The method of indicating on a cathode ray tube the distance of a radio pulse reflecting object which includes the steps of radiating pulses of radio frequency energy, deriving a synchronizing current from said radiated pulses, applying said current to said cathode ray tube to deflect said cathode ray to indicate distance, deriving the radio frequency components of said radiated pulses to provide ray deflecting forces for said cathode ray tube, applying said forces to said cathode ray for indicating time intervals corresponding to said radio frequency, receiving said pulses after reflection from said object, amplifying the radio frequency components of said received pulses, and applying said amplified radio frequency components to said tube to deflect said cathode ray to indicate the propagation time required for said pulses to travel to said object and from said object to the source of said pulse radiation and hence the distance of said object.

11. The method of indicating on a cathode ray tube the distance of a radio pulse reflecting object which includes the steps of radiating pulses of radio frequency energy, rectifying said pulses to derive a sweep current in synchronism with said pulses, applying said sweep current to said tube to deflect said ray, applying the radio frequency components of said radiated pulses to said tube to apply timing deflections to said deflected ray, receiving said pulses after reflection from said object, and applying said received pulses to said tube thus to deflect said ray to indicate the distance of said object.

12. The method of indicating on a cathode ray tube the distance of a radio pulse reflecting object which includes the steps of radiating pulses of radio frequency energy, rectifying said pulses to derive a sweep current in synchronism with said pulses, applying said sweep current to said tube to deflect said ray, applying the radio frequency components of said radiated pulses to said tube to apply timing deflections to said deflected ray, receiving said pulses after reflection from said object, amplifying the radio frequency components of said received pulses, and applying the amplified radio frequency components to said tube to deflect said ray thus to indicate the distance of said object.

13. The method of indicating on a cathode ray tube the distance of a radio pulse reflecting object which includes the steps of radiating pulses of radio frequency energy, generating sweep voltages in synchronism with said pulse radiations, amplifying said sweep voltages to derive a faster sweep voltage, applying said faster sweep voltage to said tube to deflect said ray, applying the radio frequency components of said radiated pulses to said tube to deflect said ray at predetermined intervals corresponding to known distances, receiving said radiated pulses after reflection from said object, and applying said received pulses to said tube to deflect said ray thus to indicate the distance of said object.

14. The method of indicating on a cathode ray tube the distance of a radio pulse reflecting object which includes the steps of radiating pulses of radio frequency energy, generating sweep voltages in synchronism with said pulse radiations, amplifying said sweep voltages to derive a faster sweep voltage, applying said amplified voltages to said tube to deflect said ray, applying the radio frequency components of said radiated pulses to said tube to deflect said ray at predetermined intervals corresponding to known distances, receiving said radiated pulses after reflection from said object, amplifying the radio frequency components of said received pulses, and applying said amplified radio frequency components to said tube to deflect said ray thus to indicate the distance of said object.

15. A pulse echo system including in combination means for radiating pulses of radio frequency energy, means for receiving said pulses directly and after reflection from a body whose distance is to be measured, means for deriving a component signal from said radiated pulses, an indicator for indicating simultaneously the distance of said body and the time rate of change of said distance, means for applying said directly received pulses and said reflected received pulses to said indicator, and means for applying said component signal derived from said radiated pulses to said indicator to produce therein a timing wave varying in amplitude at the frequency of said radiated radio frequency energy and to superimpose thereon the carrier frequency components of said reflected received pulses to indicate the distance of said body by the position of said superimposed pulses with respect to said timing wave.

16. A pulse echo distance and rate of change of distance indicating system including means for generating pulses of radio frequency energy, means for radiating said pulses toward an object whose distance and rate of change of distance are to be indicated as functions of time, means for receiving said pulses after reflection from said object, a cathode ray indicator having distance and amplitude scales, means for deflecting said cathode ray along said distance scale in synchronism with the radiation of said pulses, means for deflecting said ray along said amplitude scale by the radio frequency components of said pulses to apply time marking to said indicator, and means including said receiving means for deflecting additionally said ray along said amplitude scale as a function of the received reflected pulses so that the time marked position of said additional deflection indicates the distance of said object and the rate of change of the amplitude of said additional deflection indicates the rate of change of distance of said object.

17. A pulse distance measuring system including in combination, means for radiating pulses of high frequency energy, means for receiving said pulses after they have traversed the medium in which said distance is to be measured, means for deriving a first and a second signal of the same wave form as the high frequency energy waves of said received pulses, means for deriving a sweep voltage from said pulses of high frequency energy, an indicator, and means for applying to said indicator said sweep voltage and for applying directly said first and second signals whereby the phase of said first and second signals may be compared to determine said distance.

18. The method of determining distance which includes radiating pulses of high frequency energy, receiving said pulses after they have traversed the medium in which said distance is to be measured, deriving a first and a second signal of the same wave form as the high frequency waves of said received pulses, deriving a sweep voltage from said pulses of high frequency energy, and utilizing said sweep voltage and directly utilizing said first and second signals to determine distance as a function of the phase of said first and second signals.

IRVING WOLFF.

REFERENCES CITED

The following references are of record in the file of this patent:

UNITED STATES PATENTS

| Number | Name | Date |
| --- | --- | --- |
| 1,924,174 | Wolf | Aug. 29, 1933 |
| 2,227,598 | Lyman et. al. | Jan. 7, 1941 |

FOREIGN PATENTS

| Number | Country | Date |
| --- | --- | --- |
| 111,594 | Australia | Mar. 19, 1939 |